(12) United States Patent
Sing et al.

(10) Patent No.: US 6,834,633 B2
(45) Date of Patent: Dec. 28, 2004

(54) SPRING RELEASE STARTER FOR CHAIN SAW

(75) Inventors: J. Barney Sing, Chandler, AZ (US); Neil Greer Griffin, Chandler, AZ (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 10/664,360

(22) Filed: Sep. 15, 2003

(65) Prior Publication Data

US 2004/0123828 A1 Jul. 1, 2004

Related U.S. Application Data

(63) Continuation-in-part of application No. 10/266,309, filed on Oct. 8, 2002, now Pat. No. 6,782,863.

(51) Int. Cl.[7] ................................................. F02N 3/02
(52) U.S. Cl. ................................ 123/185.3; 123/185.39
(58) Field of Search ......................... 123/185.3, 185.14; 185/39, 40 R, 41 R, 41 A, 41 C

(56) References Cited

U.S. PATENT DOCUMENTS

| | | |
|---|---|---|
| 1,056,972 A | 3/1913 | Coleman |
| 1,733,361 A | 10/1929 | Rice, Jr. |
| 2,181,805 A | 11/1939 | Fritz |
| 3,010,443 A | 11/1961 | Lyvers |
| 3,306,277 A | 2/1967 | Gudmundsen |
| 3,324,842 A | 6/1967 | Haas |
| 3,861,374 A | 1/1975 | Dooley et al. |
| 3,952,718 A | 4/1976 | Meyer |
| 4,019,490 A | 4/1977 | Reese |
| 4,068,644 A | 1/1978 | Newport |
| 4,103,660 A | 8/1978 | Reese |
| 4,104,927 A | 8/1978 | Jensen et al. |
| 4,359,021 A | 11/1982 | Frahm |
| 4,429,668 A | 2/1984 | Nakagawa et al. |
| 4,441,466 A | 4/1984 | Tangorra |
| 4,471,733 A | 9/1984 | Tangorra et al. |
| 4,480,605 A | 11/1984 | Bloemers |
| 4,492,190 A | 1/1985 | Greenwood et al. |
| 4,543,922 A | 10/1985 | Fugazza et al. |
| 4,637,360 A | 1/1987 | Osakabe |
| 4,658,775 A | 4/1987 | Greenwood et al. |
| 4,715,238 A | 12/1987 | Bernardi |
| 4,727,828 A | 3/1988 | Ueno et al. |
| 4,815,430 A | 3/1989 | Ueno et al. |
| 4,821,691 A | 4/1989 | Ueno et al. |
| 4,848,288 A | 7/1989 | Murase et al. |
| 5,048,477 A | 9/1991 | Wada et al. |
| 5,083,534 A | 1/1992 | Morishima et al. |

(List continued on next page.)

FOREIGN PATENT DOCUMENTS

| | | |
|---|---|---|
| EP | 1 203 883 A2 | 8/2002 |
| JP | 2001-132591 | 5/2001 |

*Primary Examiner*—Mahmoud Gimie
*Assistant Examiner*—Arnold Castro
(74) *Attorney, Agent, or Firm*—Wegman, Hessler & Vanderburg

(57) ABSTRACT

A starter mechanism for an internal combustion engine having a spring that is wound during the starting operation of the internal combustion engine. As the operator pulls the starter rope of the engine the starter spring begins to wind creating a force within the spring. Once the spring force overcomes the compression force of the piston the spring will unwind thereby turning the crankshaft of the engine and consequently starting the engine. The starter rope is returned to the housing of the starter mechanism by the use of a rope return spring.

19 Claims, 15 Drawing Sheets

U.S. PATENT DOCUMENTS

| | | |
|---|---|---|
| 5,113,816 A | 5/1992 | Morishima et al. |
| 5,115,773 A | 5/1992 | Morishima |
| 5,159,845 A | 11/1992 | Wada et al. |
| 5,163,392 A | 11/1992 | Morishima et al. |
| 5,186,134 A | 2/1993 | Morishima et al. |
| 5,197,422 A | 3/1993 | Olesky et al. |
| 5,287,832 A * | 2/1994 | Uhl .................. 123/185.3 |
| 5,322,040 A | 6/1994 | Lo |
| 5,333,580 A | 8/1994 | Hopkins |
| 5,351,565 A | 10/1994 | Wada et al. |
| 5,361,738 A | 11/1994 | Iida |
| 5,379,734 A | 1/1995 | Tsunoda et al. |
| 5,537,966 A | 7/1996 | Ohnishi |
| 5,564,378 A | 10/1996 | Rodriguez |
| 5,636,606 A | 6/1997 | Tsunoda et al. |
| 5,676,103 A | 10/1997 | Tsunoda et al. |
| 5,715,783 A | 2/1998 | Osakabe et al. |
| 5,970,940 A | 10/1999 | Penton |
| 6,199,529 B1 | 3/2001 | Kuwabara et al. |
| 6,230,678 B1 | 5/2001 | Gracyalny et al. |
| 6,240,611 B1 | 6/2001 | Chase |
| 6,240,889 B1 | 6/2001 | Kuwabara et al. |
| 6,260,529 B1 | 7/2001 | Gracyalny et al. |
| 6,263,852 B1 | 7/2001 | Gracyalny et al. |
| 6,311,663 B2 | 11/2001 | Gracyalny et al. |
| 6,325,036 B1 | 12/2001 | Gracyalny et al. |
| 6,374,791 B1 | 4/2002 | Kuwabara et al. |
| 2001/0047786 A1 | 12/2001 | Kawasaki et al. |
| 2002/0023608 A1 | 2/2002 | Poehlman et al. |
| 2002/0092493 A1 | 7/2002 | Iida et al. |
| 2002/0121257 A1 | 9/2002 | Morishige et al. |
| 2002/0185352 A1 | 12/2002 | Husges |
| 2003/0015162 A1 | 1/2003 | Harada et al. |
| 2004/0065289 A1 * | 4/2004 | Leasure et al. ........ 123/185.14 |

* cited by examiner

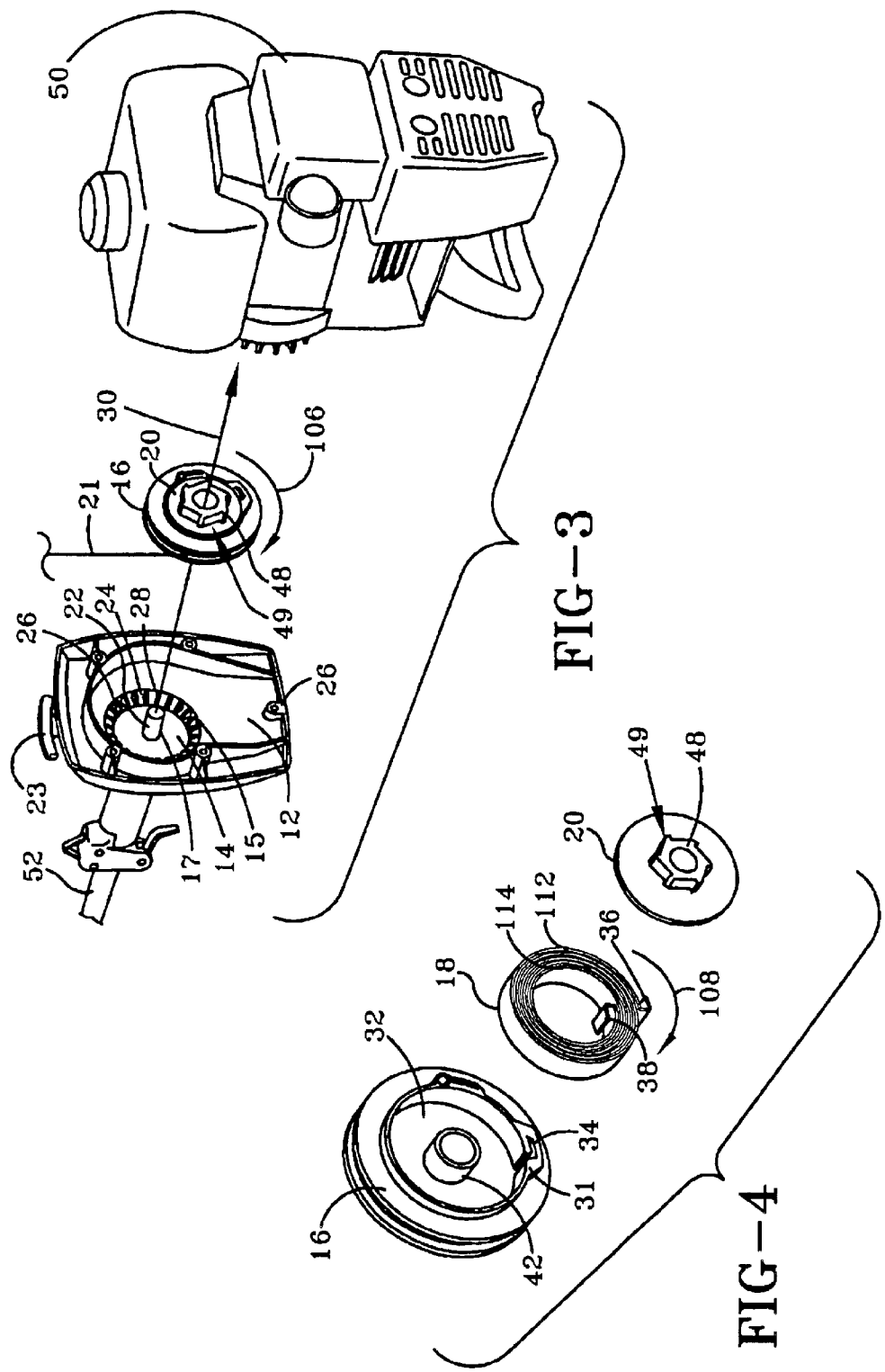

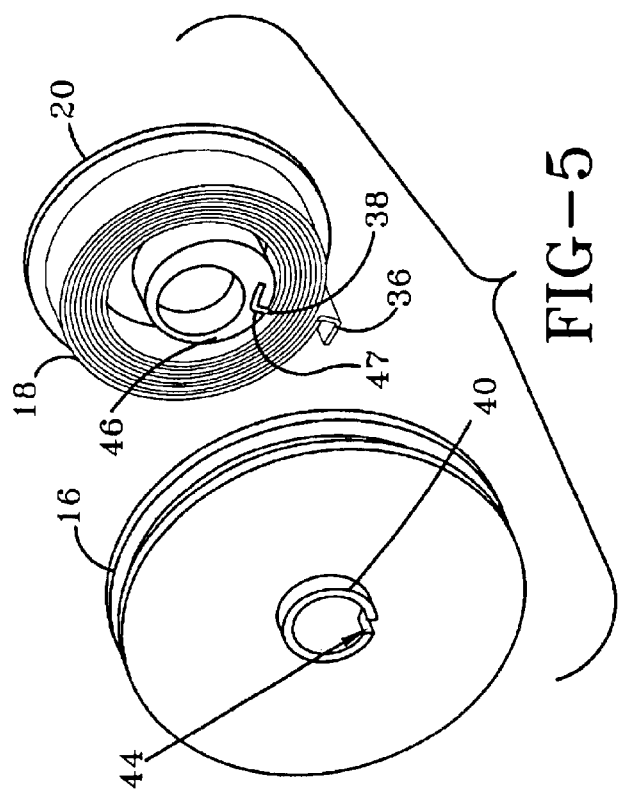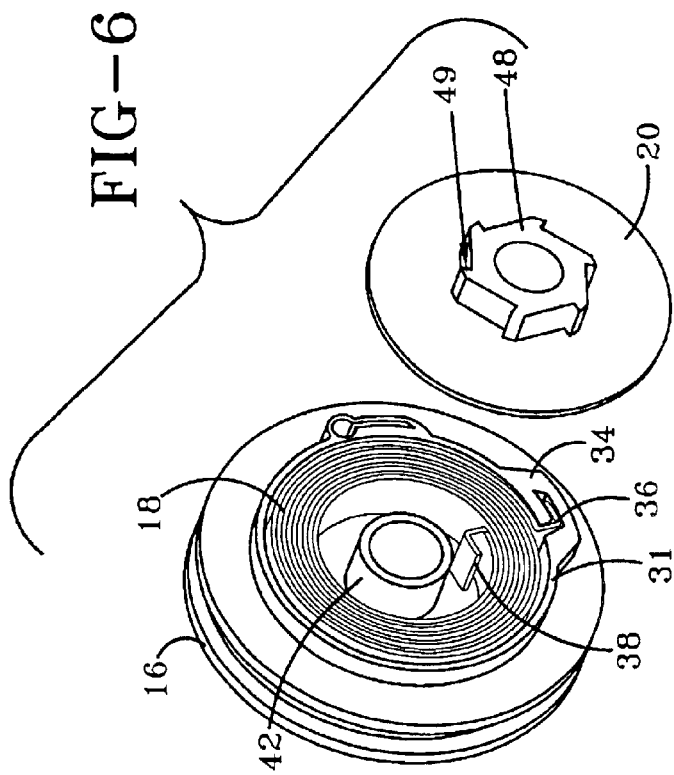

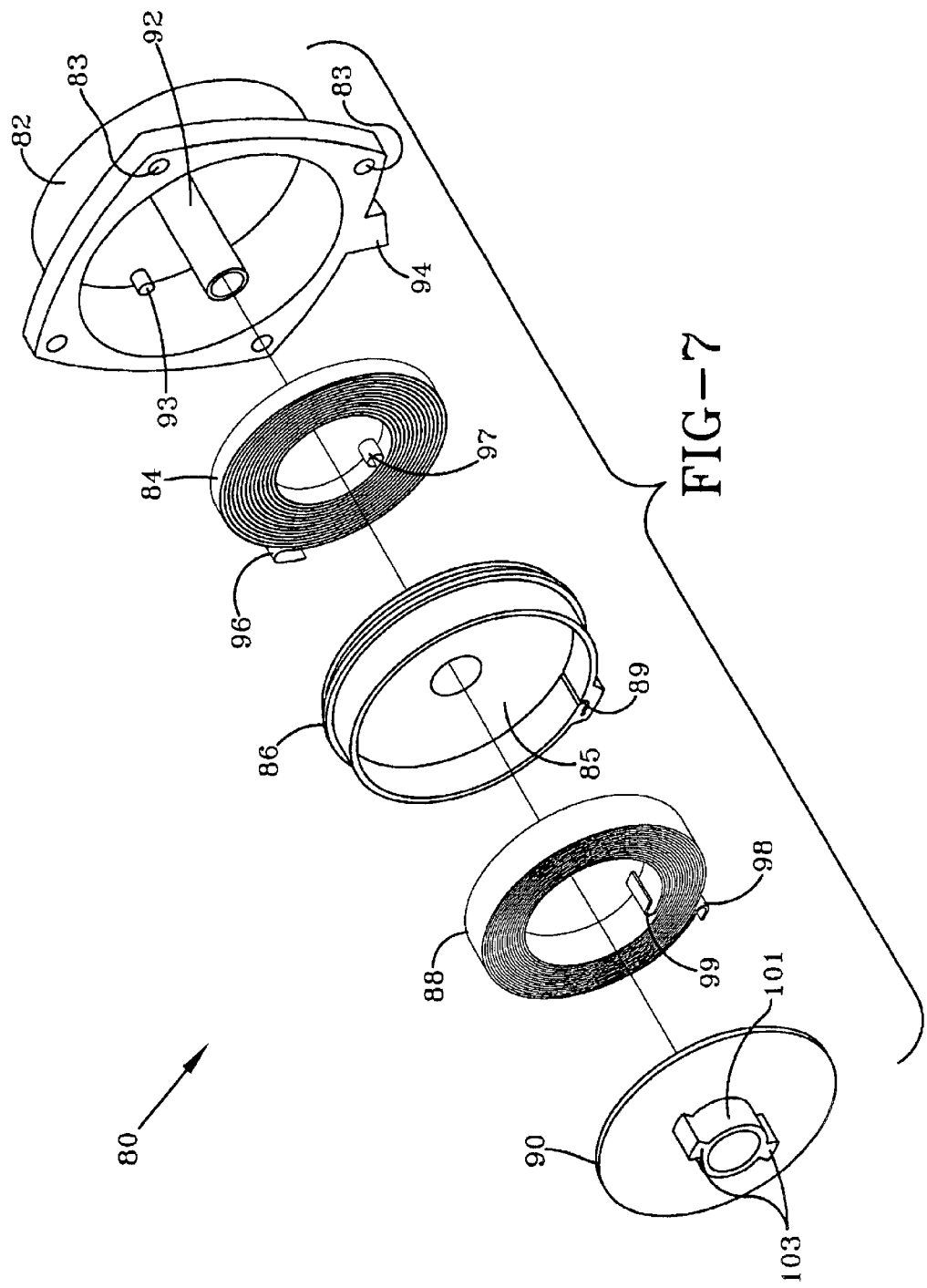

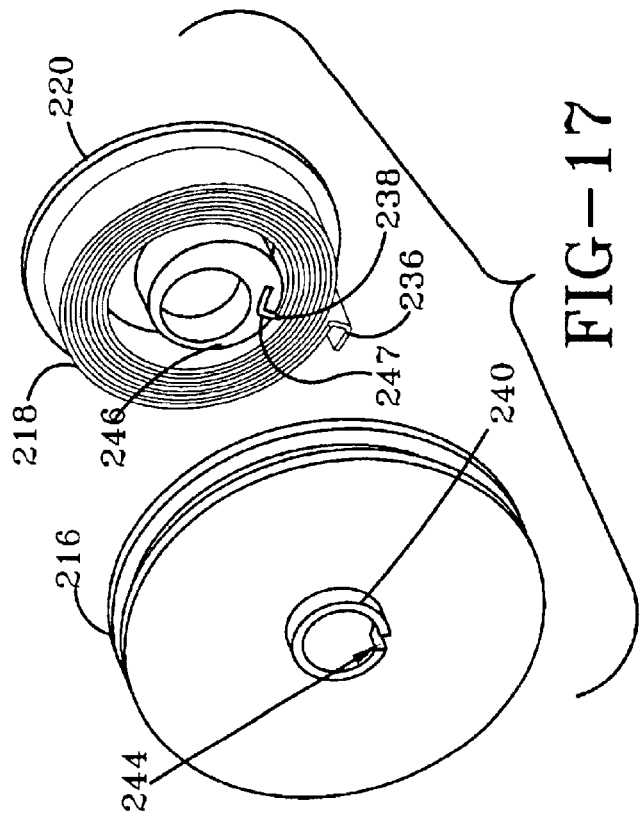
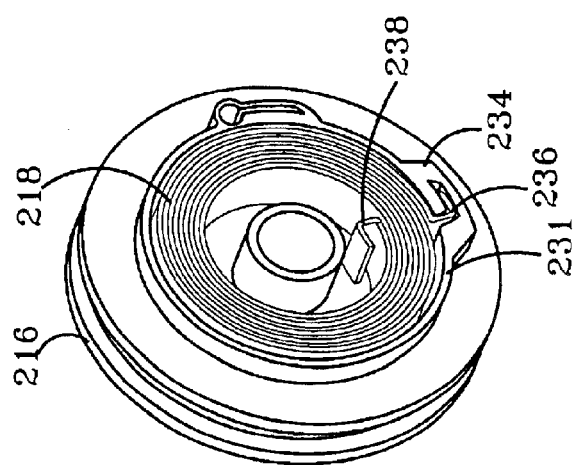

US 6,834,633 B2

SPRING RELEASE STARTER FOR CHAIN SAW

This application is a continuation-in-part of U.S. Ser. No. 10/266,309, entitled Spring Release Starter, which was filed Oct. 8, 2002 now U.S. Pat. No. 6,782,863.

I. BACKGROUND OF THE INVENTION

A. Field of Invention

The present invention relates to the field of engine starters and, more specifically, to a spring recoil starter used to facilitate the start of an internal combustion engine.

B. Description of the Related Art

It is known to use recoil starters to assist in the starting of small internal combustion engines. Such recoil starters are typically activated when an operator pulls a starter rope that is operatively connected to the starter. Generally, the operator must exert a fair amount of energy to overcome the compression force of the engine piston in order to start the engine. Once the operator pulls the starter rope, the rope or handle is then returned back to the starter housing via a rope return spring. This type of starter has two distinct disadvantages: 1) As previously mentioned the operator must exert a certain amount of energy or force to overcome the compression force of the piston in order to start the engine; 2) The compression force of the piston creates a jerking motion that is typically felt by the operator.

There have been several proposed methods to overcome the above-mentioned disadvantages. One such method, discussed in U.S. Pat. No. 5,537,966 to Ohnishi employs a power storage type of recoil starter that uses spiral springs to assist in starting the internal combustion engine. The Ohnishi patent the operator repeatedly pulls the starter rope to wind the spiral springs thereby storing energy in the spiral springs wherein this energy is then used to start the engine. As the operator continues to pull on the rope, the spiral springs continue to wind and the tension is held on the springs by a ratcheting locking mechanism thereby preventing the springs from unwinding. Once a sufficient amount of tension is on the springs, a releasing mechanism releases the ratcheting mechanism thereby releasing the stored energy in the springs so that the starter is rotated at a high speed to start the engine. There are several disadvantages to this type of system. First, the operator must pull the rope multiple times in order to wind the springs in order to create enough tension on the springs to overcome the compression force of the piston. The ratcheting system also requires more parts, which in turn is more expensive to manufacture. In addition, if the engine does not start after several pulls, energy is still stored in the spiral springs. If the operator leaves the device alone, any type of external force applied to the engine could disengage the ratcheting mechanism thereby releasing the energy in the springs, which in turn then can start the engine.

Other known prior art methods include those discussed in U.S. Pat. No. 4,543,922 to Fugazza et al. and U.S. Pat. No. 4,441,466 to Tangorra. Both of these patents employ an elastomeric material to store energy to facilitate the starting of the internal combustion engine. The disadvantage to this type of a starting mechanism is that in order to overcome the compression force of the piston, the elastomeric material must be of substantial size to overcome the force. This defeats the purpose of designing a compact starter for use in small engine applications, such as those on hand held string trimmers. In addition, both of these patents employ an external ratcheting or locking mechanism to prevent the elastomeric material from releasing prior to reaching its desired tension. Both of these ratcheting or locking mechanisms require an external force by the operator to start the engine.

II. SUMMARY OF THE INVENTION

Accordingly, one of the primary objectives of the present invention is to create a solution for the problems described above. The present invention overcomes the aforementioned disadvantages by employing a starter spring to assist the operator in starting the internal combustion engine. As the operator pulls the starter rope, the starter spring winds and accumulates tension until it overcomes the compression force of the piston, at which time the starter spring will unwind thereby rotating the engine thereby starting the engine. The diameter of the rope pulley and the length of the starter rope, as well as the size and strength of the starter spring are designed such that only one pull of the rope will start the engine.

It is therefore one object of the present invention to provide a starter for an internal combustion engine to allow the operator to easily start the engine with little effort.

It is another object of the present invention to provide an internal combustion engine to be used in small engine applications, such as those used on hand held string trimmers.

It is yet another object of the present invention to provide a starter that will increase the safety of the operators of the machines, which make use of the starter.

It is yet another object of the present invention to provide a starter for use on an internal combustion engine that will meet the strict EPA restrictions requiring low $CO_2$ and NOX emissions.

Finally, it is yet another object of the present invention to provide a starter on an internal combustion engine that eliminates the jerking sensation during the starting process felt by the operator on conventional starters.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 3 is an assembly view showing the interconnection of the present invention with a string trimmer and an internal combustion engine.

FIG. 4 is an exploded view of the present invention.

FIG. 5 is a perspective view showing the connection of the starter spring with the arbor.

FIG. 6 is a perspective view of the present invention showing the connection of the starter spring to the pulley.

FIG. 7 is an exploded view of a second embodiment of the present invention.

FIG. 17 is a perspective view showing the connection of the starter spring with the arbor.

FIG. 18 is a perspective view of the present invention showing the connection of the starter spring to the pulley.

V. DESCRIPTION OF THE PREFERRED EMBODIMENT

Figure 2:
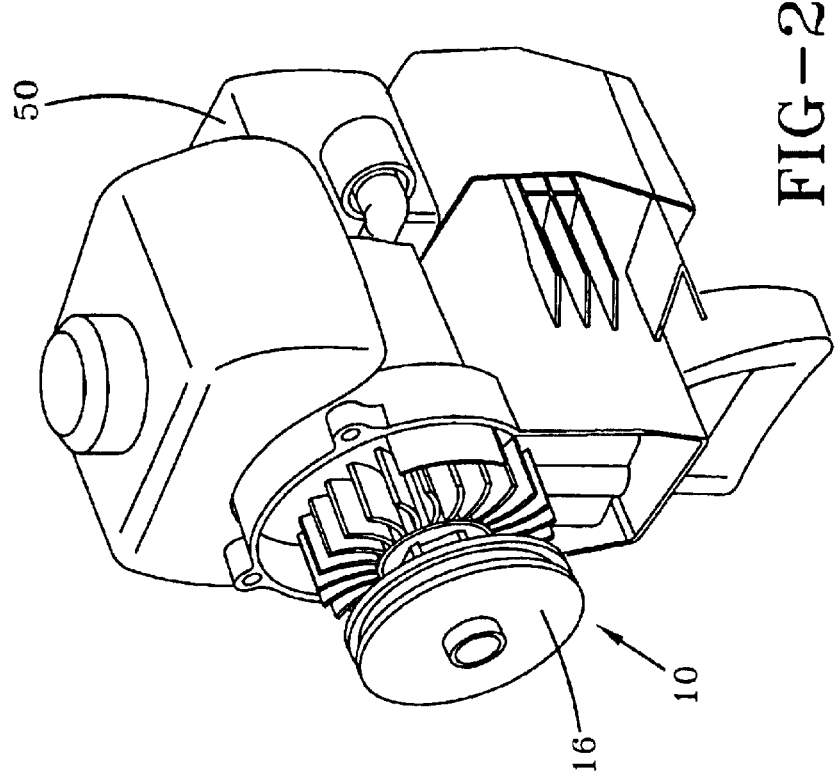
FIG. 2 is a perspective view of the present invention attached to an internal combustion engine.
Figure 1:
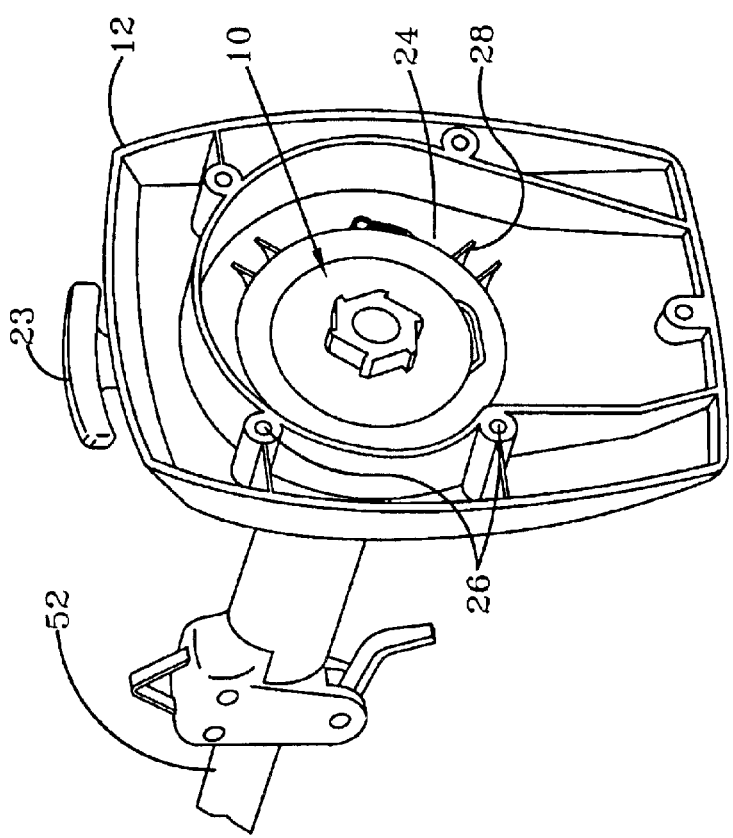
FIG. 1 is a perspective view of the inside of the housing of the present invention.

Referring now to the drawings wherein the showings are for purposes of illustrating a preferred embodiment of the invention only and not for purposes of limiting the same, FIG. 1 shows a spring assist starter mechanism 10 according to this invention connected to an engine housing, which is mounted to an engine that may be used to operate a hand held tool such as a string trimmer (not shown). FIG. 2 shows the same starter mechanism 10 positioned inside the housing where it can engage the flywheel 51 or crankshaft (not shown) of an internal combustion engine 50. It should be noted that the starter mechanism 10 illustrated in FIG. 1 is the same starter mechanism as illustrated in FIG. 2. Thus, while for the purpose of illustration the engine 50 shown in FIG. 2 has been separated from the housing 12 shown in FIG. 1, it should be noted that only one starter mechanism 10 is required for each application. Furthermore, it should be noted that the present invention is not limited to use on a conventional string trimmer. The present invention can be used on any type of internal combustion engine application chosen with sound engineering judgment such as a leaf blower, a lawn mower, a snow blower, and the like. The operation of the string trimmer is well known in the art and will not be described herein.

Referring to FIGS. 3 and 4, in the preferred embodiment, the components of the present invention include a housing 12, a rope return spring 14, a pulley 16, a starter spring 18, and an arbor 20. FIG. 3 further illustrates the location of a pull rope 21 and a rope handle 23. The housing 12 contains a post 22 that extends in an outward direction from its center and is a guide or bearing surface for the pulley. The post 22 can be hollow to allow the engine's power shaft to pass through. The housing 12 further consists of mounting holes 26 that are used to mount the housing 12 to the mounting holes (not shown) on the engine 50.

With continued reference to FIGS. 3 and 4, the rope return spring 14 can be seen mounted into the housing 12. The rope return spring 14 has a first U-shaped end 15 that is connected to the housing 2 and a second U-shaped end 17 that connects to the pulley 16 as will be described below. The pulley 16, the starter spring 18, and the arbor 20 are then inserted into the housing 12 and over the post 22 whereupon the second U-shaped end 17 of the rope return spring 14 engages the pulley 16. The interconnection of the parts of the starter mechanism 10 will be described in detail below. As indicated by the arrow 30 the housing 12 is then attached to the engine 50 by mating the mounting holes 26 on the housing 12 with the mounting holes (not shown) on the engine 50.

FIG. 4 shows an exploded view of the pulley 16, the starter spring 18, and the arbor 20. FIGS. 5 and 6 show a partially assembled view of the same components from both sides of the pulley 16. As shown in FIG. 5 the pulley has a first sleeve 40 that further contains a notch 44. The notch 44 is designed to receive the second U-shaped end 17 of the rope return spring 14. The pulley 16 further consists of a chamber 32, shown in FIG. 4 that receives the starter spring 18 as illustrated in FIG. 6. In addition, a second sleeve 42 extends in an outward direction from the center of the chamber 32. The second sleeve 42 is inserted into the hub 46 and when the pulley and arbor are assembled (the post 22 passes through both the pulley and arbor when they are assembled into the housing 12). Furthermore, the pulley has a slot 34 located on the outer portion 31 of the chamber 32 used to attach the starter spring 18 to the pulley 16. Each end of the starter spring 18 has a U-shaped end 36, 38 used to attach the starter spring 18 to the pulley 16 and the arbor 20 respectively. The first U-shaped end 36 attaches to the slot 34 on the outer portion 31 of the chamber 32 as illustrated in FIG. 6. The second U-shaped end 38 of the starter spring 18 attaches to the arbor 20 as subsequently described. The arbor 20 has a first hub 46 and a second hub 48. The first hub 46 has a slot 47 located on the outer portion of the hub 46. The slot 47 receives the second U-shaped end 38 of the starter spring 18 as illustrated in FIG. 5. The second hub 48 of the arbor 20 further consists of cogs 49 that extend the length and radially away from the second hub 48. The cogs 49 engage the engine 50 as will be described below.

Figure 8:
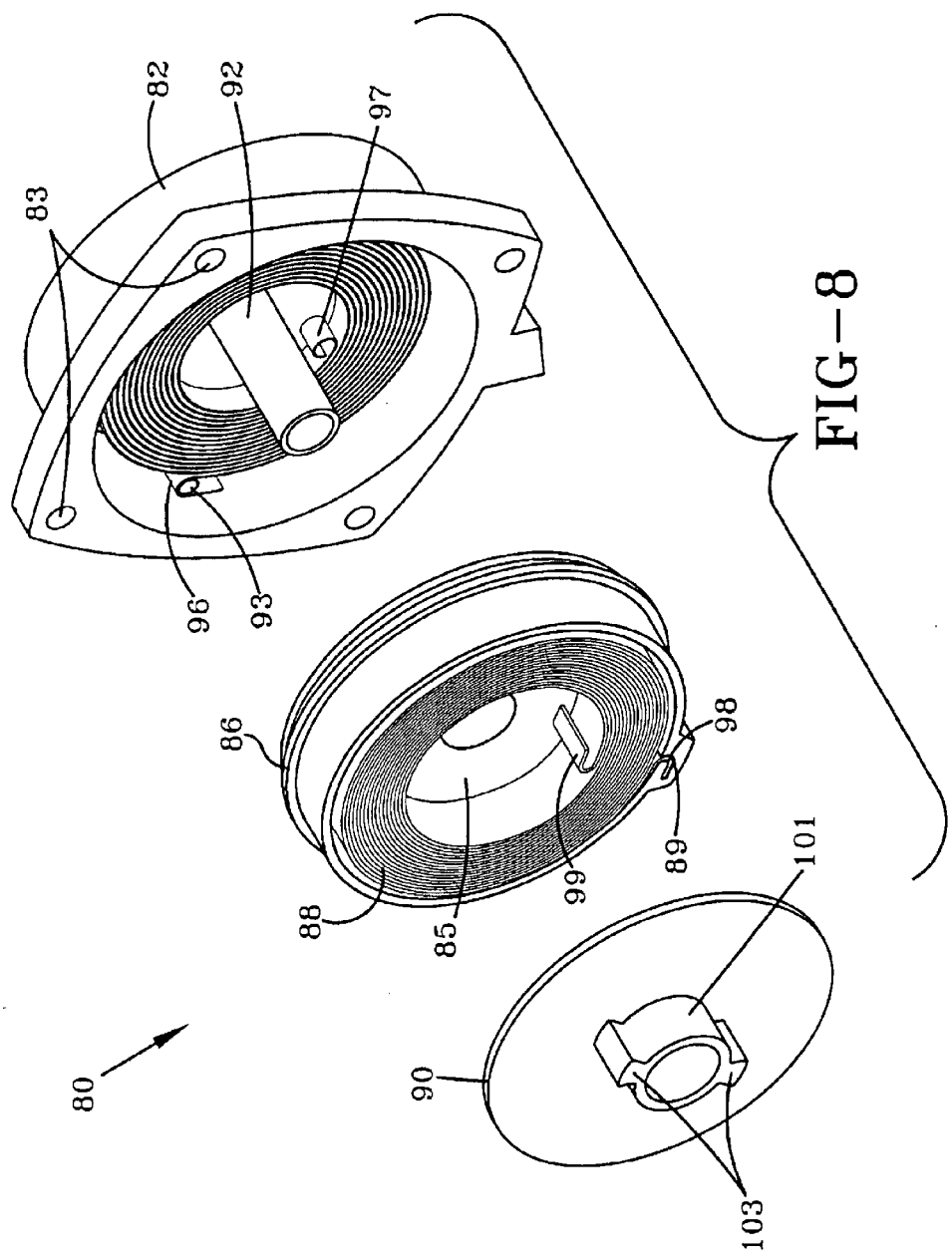
FIG. 8 is a perspective view showing some of the components of FIG. 7 in a partially assembled state.
Figure 9:
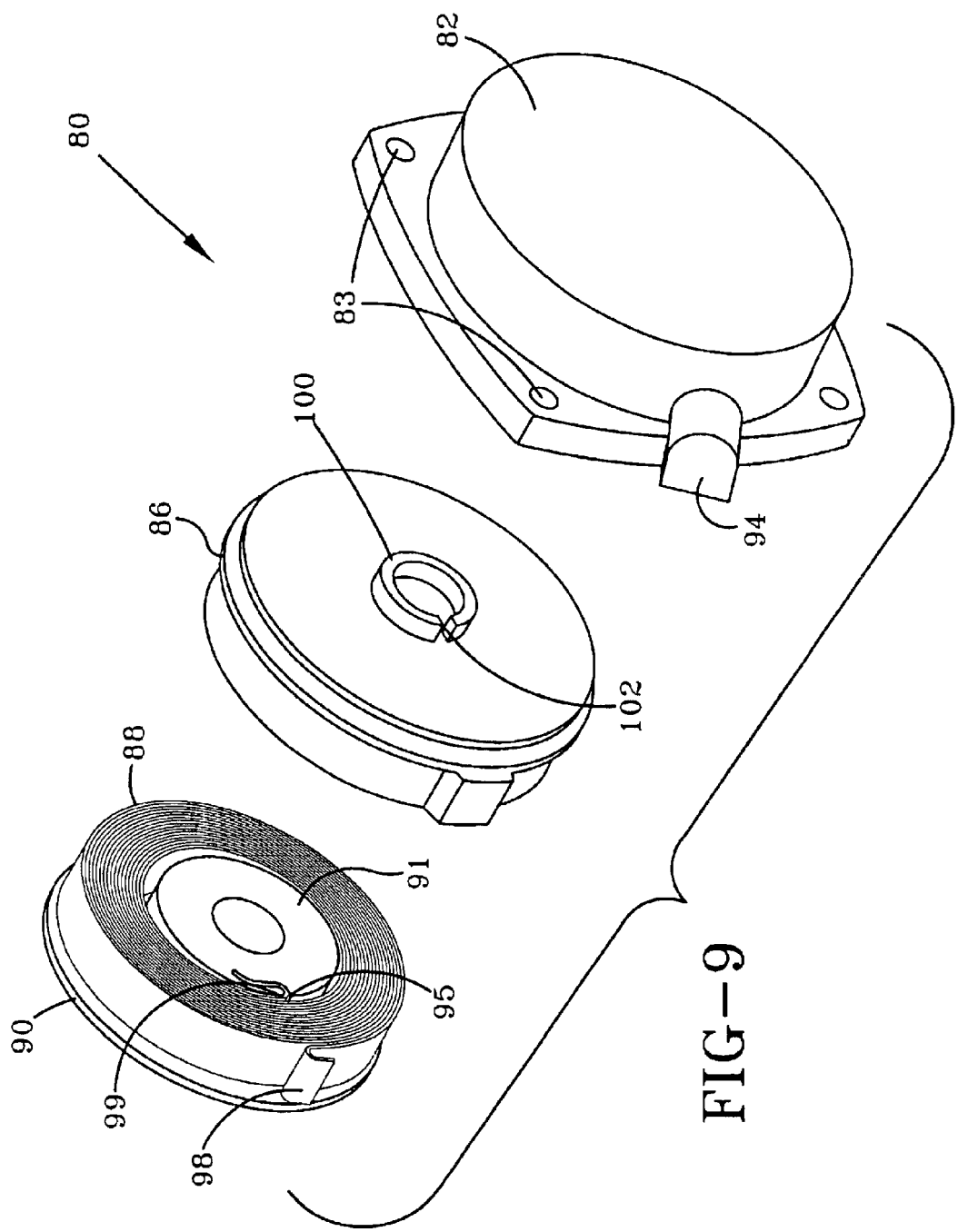
FIG. 9 is a perspective view from the opposite side of FIG. 8.

FIGS. 7–10 show a second embodiment of the present invention. This type of starter mechanism may be used to start internal combustion engines (not shown) used with other devices such as lawn mower (not shown) applications. Referring to FIG. 7, this starter mechanism 80 also consists of a housing 82, a rope return spring 84, a pulley 86, a starter spring 88, and an arbor 90. The housing 82 consists of a post 92 that extends in an outward direction from its center and acts as a guide or bearing surface for the pulley 86. Located near the perimeter of the housing 82 is a tab 93 designed to engage and secure one end of the rope return spring 84 as will be described below. The housing further consists of a hole 94 to receive the pull rope (not shown) and mounting holes 83 that mate with the mounting holes (not shown) on the engine housing (not shown). The rope return spring 84 consists of a U-shaped end 96 and a circular end 97. The U-shaped end 96 attaches to the tab 93 on the housing 82 as shown in FIG. 8. The circular end 97 of the rope return spring 84 attaches to the pulley 86 as will be subsequently described. As shown in FIG. 9, the pulley 86 consists of a sleeve 100 that contains a notch 102. The notch 102 engages and secures the circular end 97 of the rope return spring 84. Referring now to FIGS. 7 and 8 the pulley 86 contains a chamber 85 that houses the starter spring 88. At the bottom of the chamber 85 is a slot 89 that receives and secures a first U-shaped end 98 of the starter spring 88. In addition to the first U-shaped end 98 the starter spring 88 also consists of a second U-shaped end 99. The second U-shaped end 99 is attached to the arbor 90 as will be described below. The arbor 90 further consists of a first hub 91 that contains a slot 95 designed to receive the second U-shaped end 99 of the starter spring 88 as shown in FIG. 9. The arbor also consists of a second hub 101 that further contains cogs 103 that extend the length and radially away from the second hub 101. It should be noted that any number of cogs 103 may be used chosen with sound engineering judgment. The cogs 103 engage the flywheel or crankshaft (not shown) on an internal combustion engine (not shown) during the operation of the starter mechanism 80. It should be noted that in this embodiment the starter mechanism 80 is housed within the housing 82 and the housing 82 attaches to the engine housing.

Figure 10:
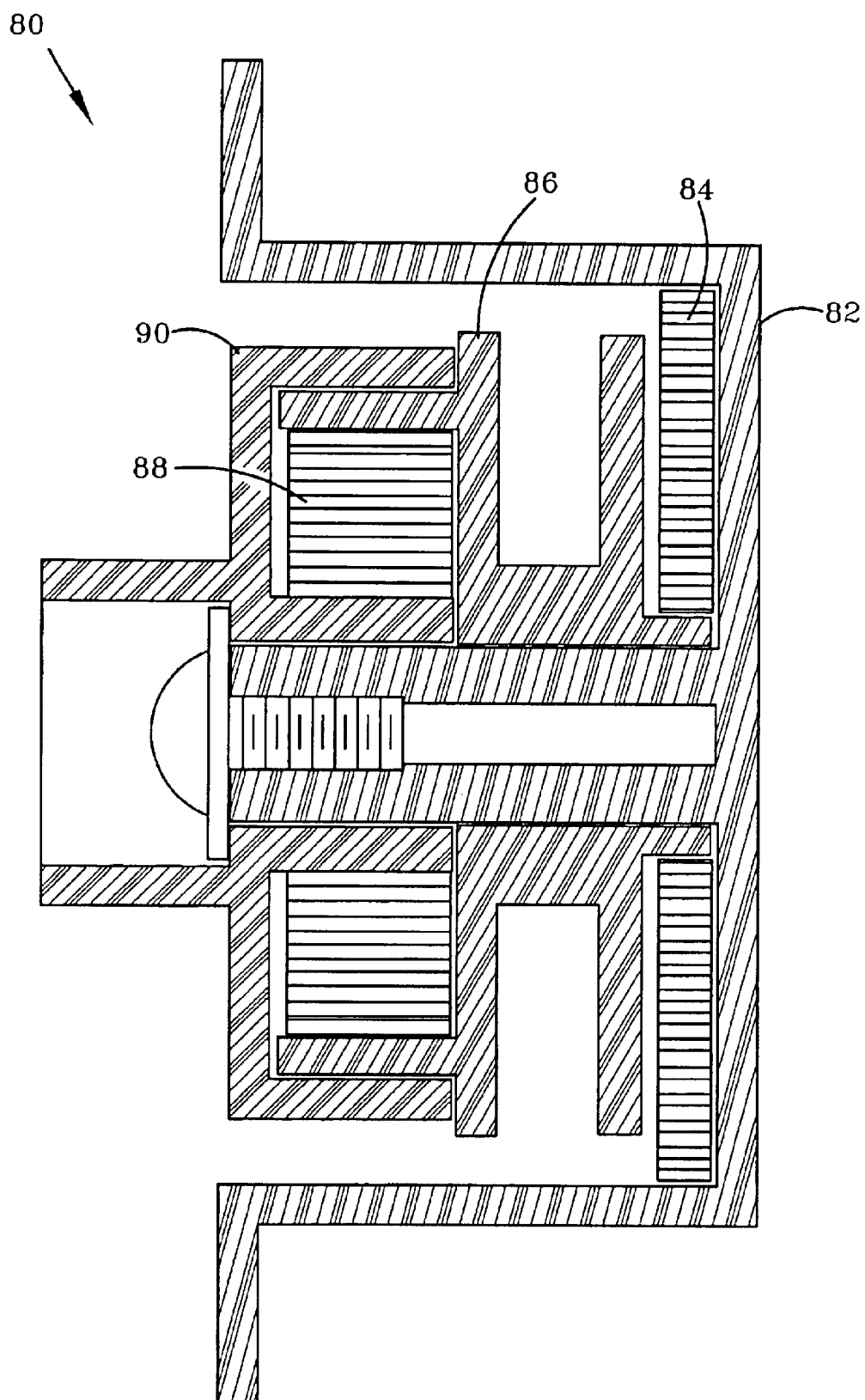
FIG. 10 is a cross-sectional view of the embodiment of FIG. 7.
Figure 11:
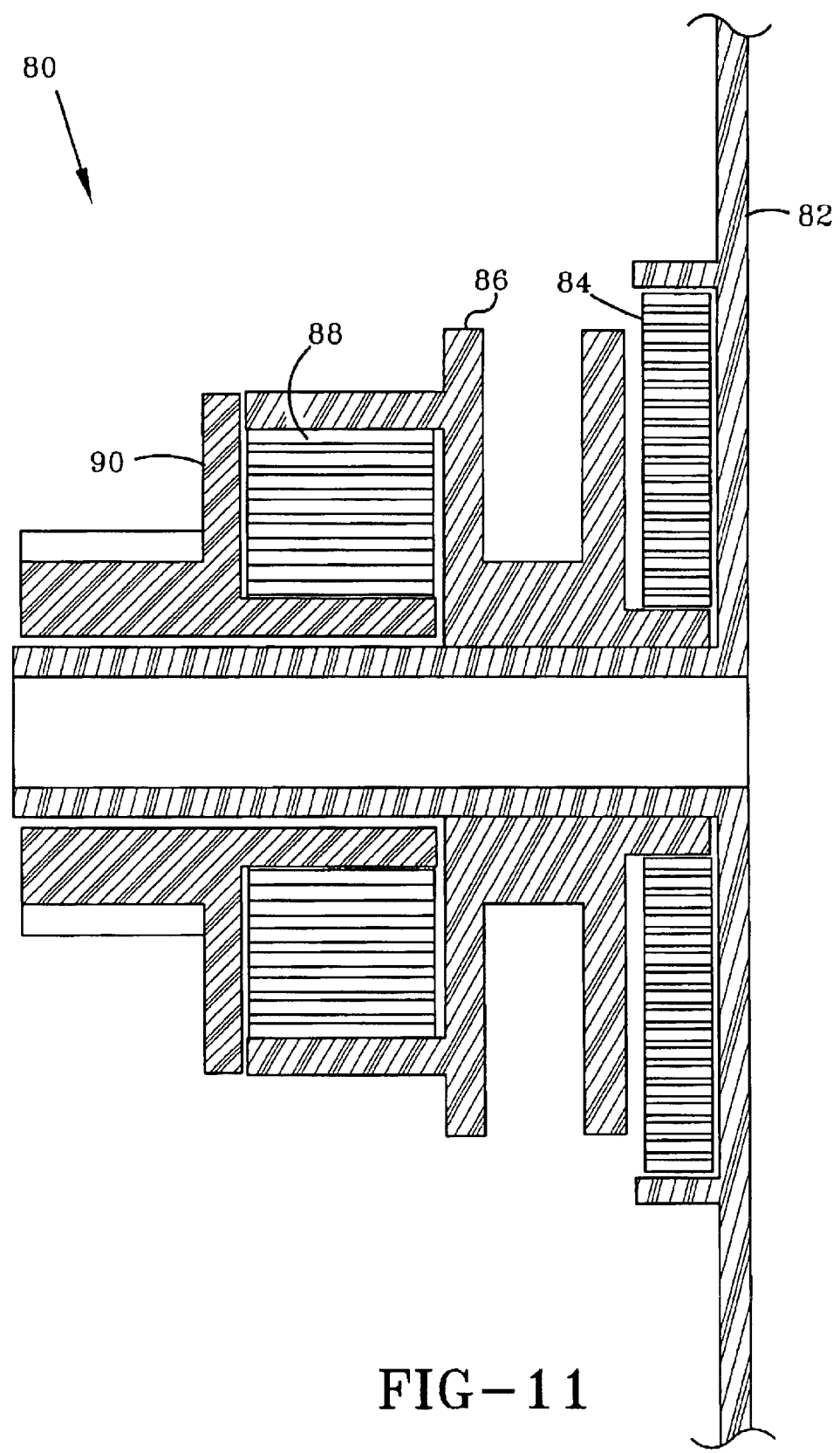
FIG. 11 is a cross-sectional view of a third embodiment.
Figure 12:
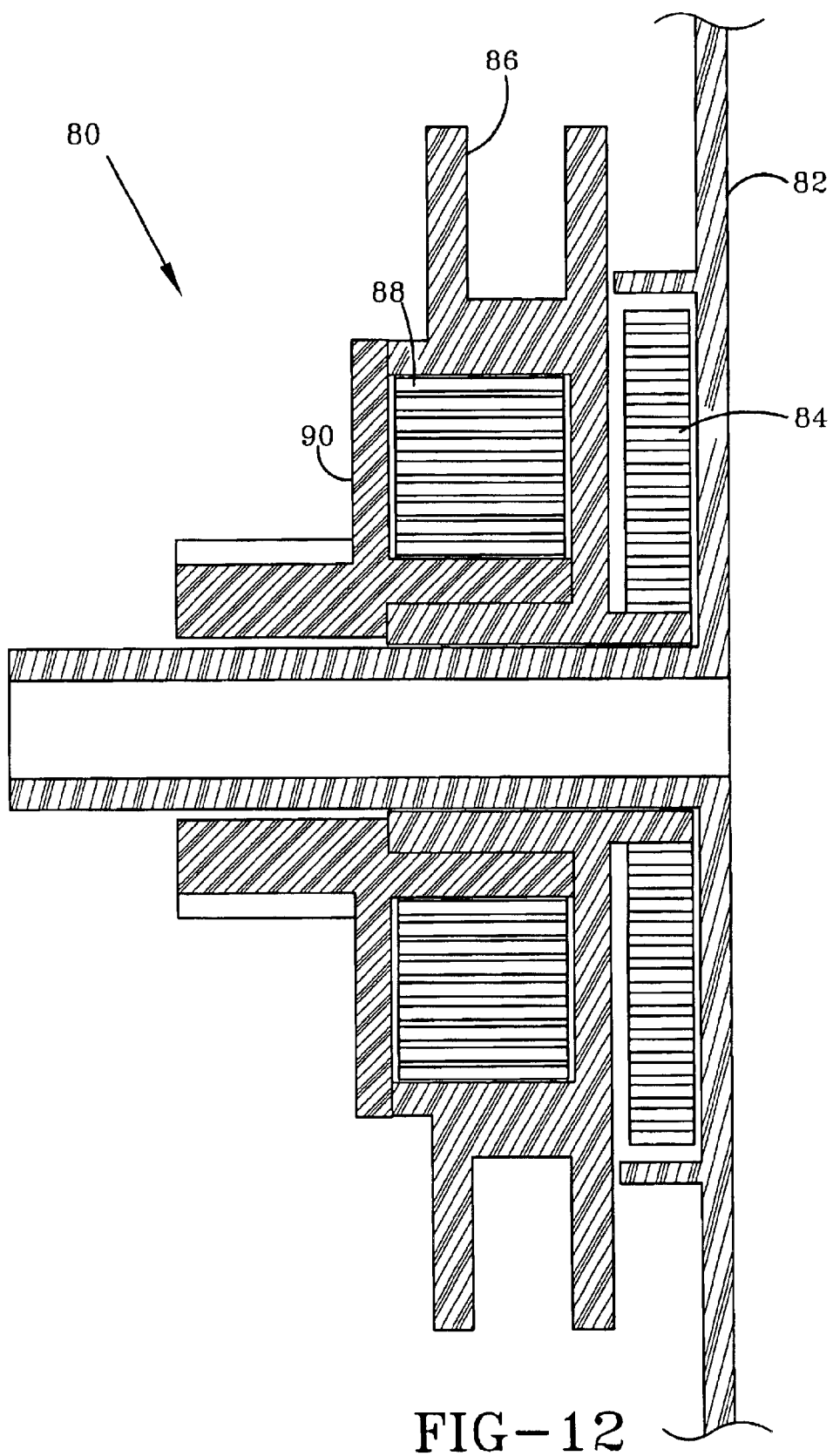
FIG. 12 is a cross-sectional view of a fourth embodiment.

FIGS. 11 and 12 show a third and fourth embodiment of the present invention. In both embodiments the connection and interaction of the components is the same as described in the second embodiment above. However, in the third and fourth embodiments the starter mechanism 80 is located within the engine housing and the starter housing 80 is mounted flush with the engine housing. As previously mentioned, in the second embodiment the starter mechanism 80 is located outside the engine housing and within the starter housing 82. Furthermore, FIGS. 10 and 11 show the starter spring 88 located in the chamber 85 in front of the pulley 86. In the fourth embodiment FIG. 12 shows the starter spring 88 located in a chamber 85 within the pulley 86. The fourth embodiment allows for a larger diameter pulley 86 to assist in the starting process and also saves space within the engine housing.

With the components of the present invention herein described, the operation of the spring release starter mechanism for the first four embodiments will now be described. For purposes of illustration, reference numbers from the preferred embodiment will be used to describe the operation of the present invention. Referring to FIG. 3, the operator grasps the rope handle 23 and begins to pull in a direction away from the engine 50. As the operator pulls the rope handle 23 the starter assembly begins to rotate in a direction as indicated by the arrow 106. As the assembly rotates, the cogs on the arbor 20 engage the flywheel or crankshaft through a standard ratchet type mechanism commonly used on pull start engines, which moves the engine's piston to its compression stroke. At this point, the outside coils 112 of the starter spring 18 begin to wind in a direction indicated by the arrow 108 in FIG. 4 while the inside coils 114 of the starter spring 18 remain stationary. As the operator continues to pull the rope handle 23 the starter spring 18 continues to wind and increase in tension. Once the force of the tension in the starter spring 18 exceeds the compression force of the piston (not shown) in the internal combustion engine 50, the inside coils 114 of the starter spring will rotate in the same direction as the outside coils 112. This in turn will cause the arbor 20 to also rotate a sufficient number of times in the direction indicated by the arrow 108 in FIG. 4. The arbor 20 being temporarily engaged the flywheel or crankshaft (not shown) of the engine 50 will cause the crankshaft to turn thereby starting the engine. After the engine 50 is started and the operator releases the rope handle 23, the rope return spring 14 will rotate in such a manner as to cause the pulley 16 to rotate in a direction opposite to the arrow 106 in FIG. 3 thereby returning the rope 21 to the housing 12.

Figure 13:
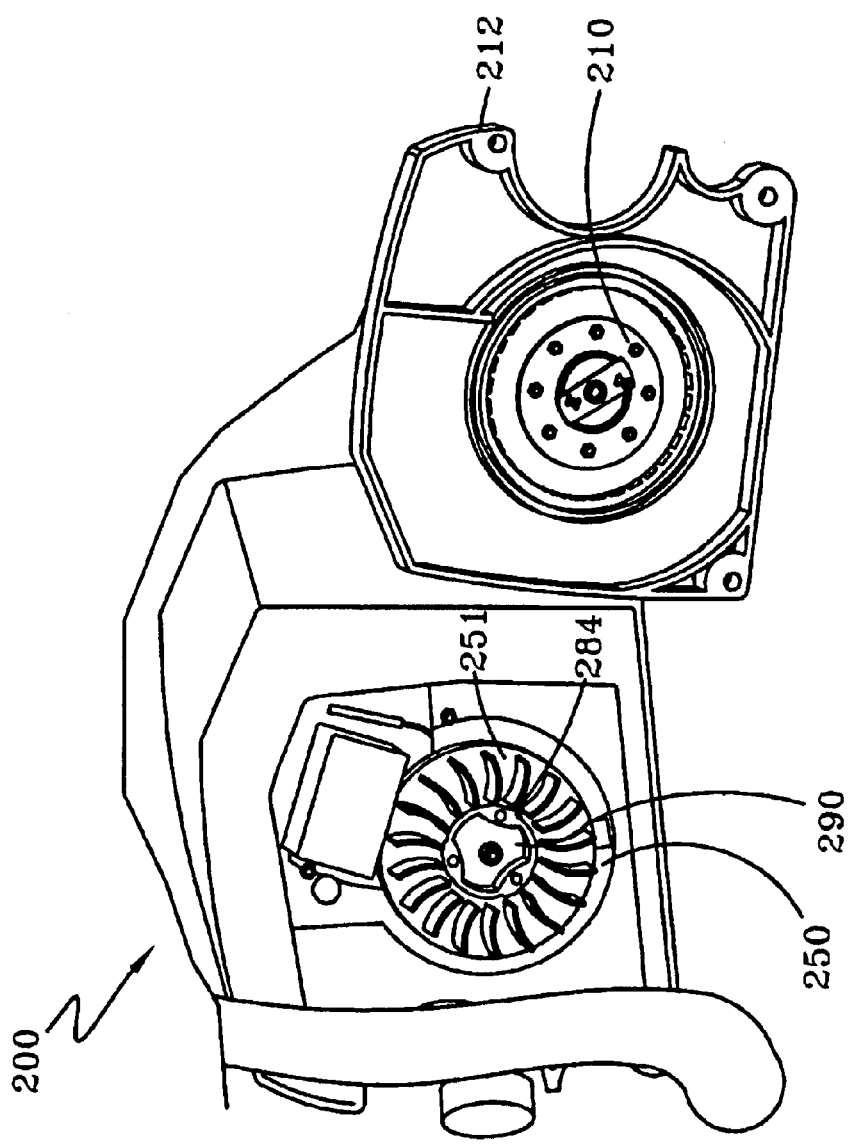
FIG. 13 is perspective view of a fifth embodiment of the present invention.

FIGS. 13–18 show a fifth embodiment of the present invention. FIG. 13 shows a spring assist starter mechanism 210 according to this invention connected to an engine housing 212, which is mounted to an engine 250 that may be used to operate a hand held tool such as a chain saw 200. The starter mechanism 210 is positioned inside the housing where it can engage the flywheel 251 or crankshaft (not shown) of an internal combustion engine 250. It should be noted that the fifth embodiment of the present invention is not limited to use on a chain saw. The fifth embodiment of the present invention can be used on any type of internal combustion engine application chosen with sound engineering judgment such as a string trimmer, leaf blower, a lawn mower, a snow blower, and the like. The operation of the chain saw is well known in the art and will not be described herein.

Referring to FIGS. 14–17, the components of the fifth embodiment are similar to the components of the preferred embodiment described above. These include a housing 212, a rope return spring 214, a pulley 216, a starter spring 218, and an arbor 220. In addition to these components the fifth embodiment further includes at least one engagement means 229 and a retaining means 233. In this embodiment the engagement means 229 consists of a starter dog 225. It should be noted however, that the engagement means 229 can consist of any type of mechanical engaging means commonly known in the art.

Figure 14:
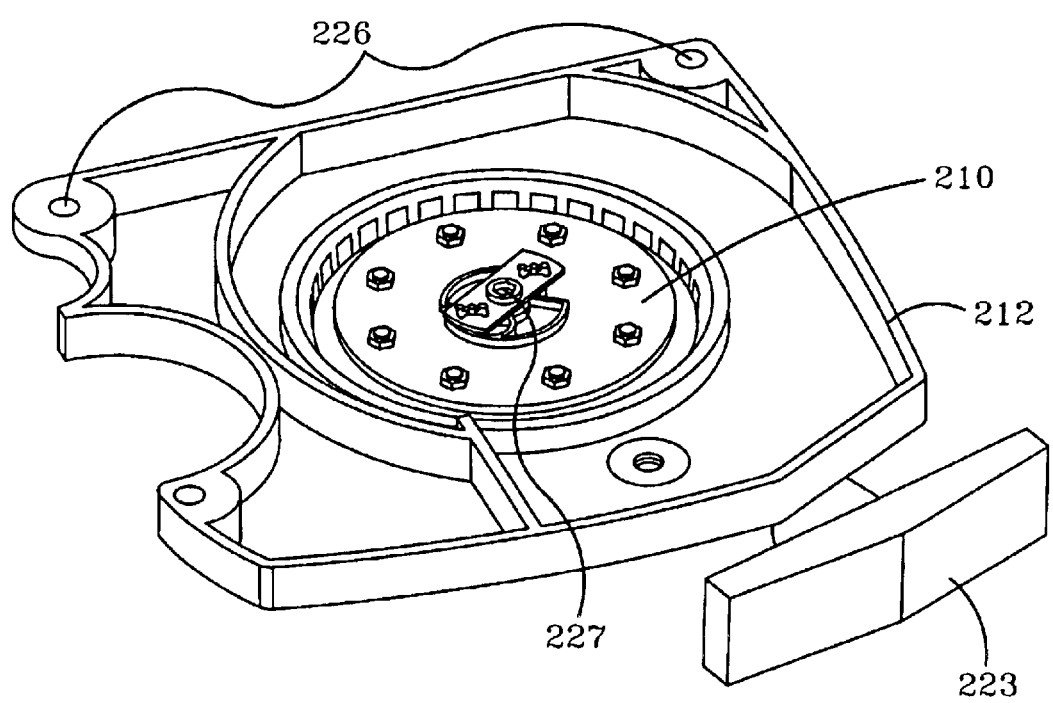
FIG. 14 is a close up view of the housing of FIG. 13 showing the engagement means in the first position.
Figure 15:
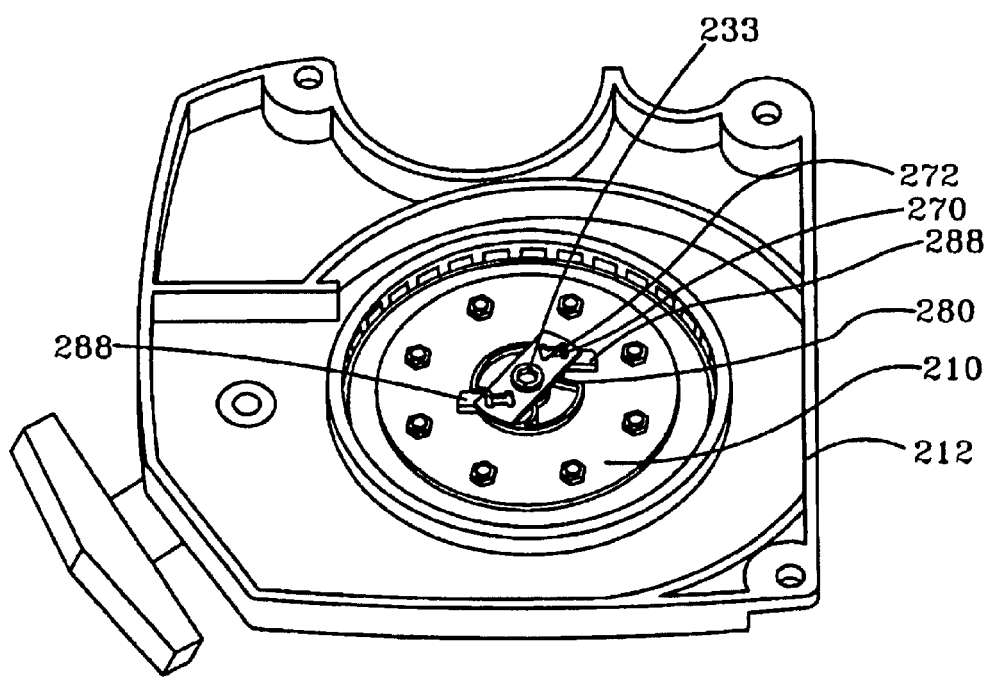
FIG. 15 is a close up view of the housing of FIG. 13 showing the engagement means in the second position.

As shown in FIG. 14, the housing 212 contains a post (not shown), similar to the post 22 shown in FIG. 3, that extends in an outward direction from its center and further contains internal threads (not shown) in order to receive a screw 227. The screw 227 attaches the starter mechanism 210 to the housing 212 via the retaining means 233 as will be described below. The housing 212 further consists of mounting holes 226 that are used to mount the housing 212 to the mounting holes (not shown) on the engine 250.

Figure 16:
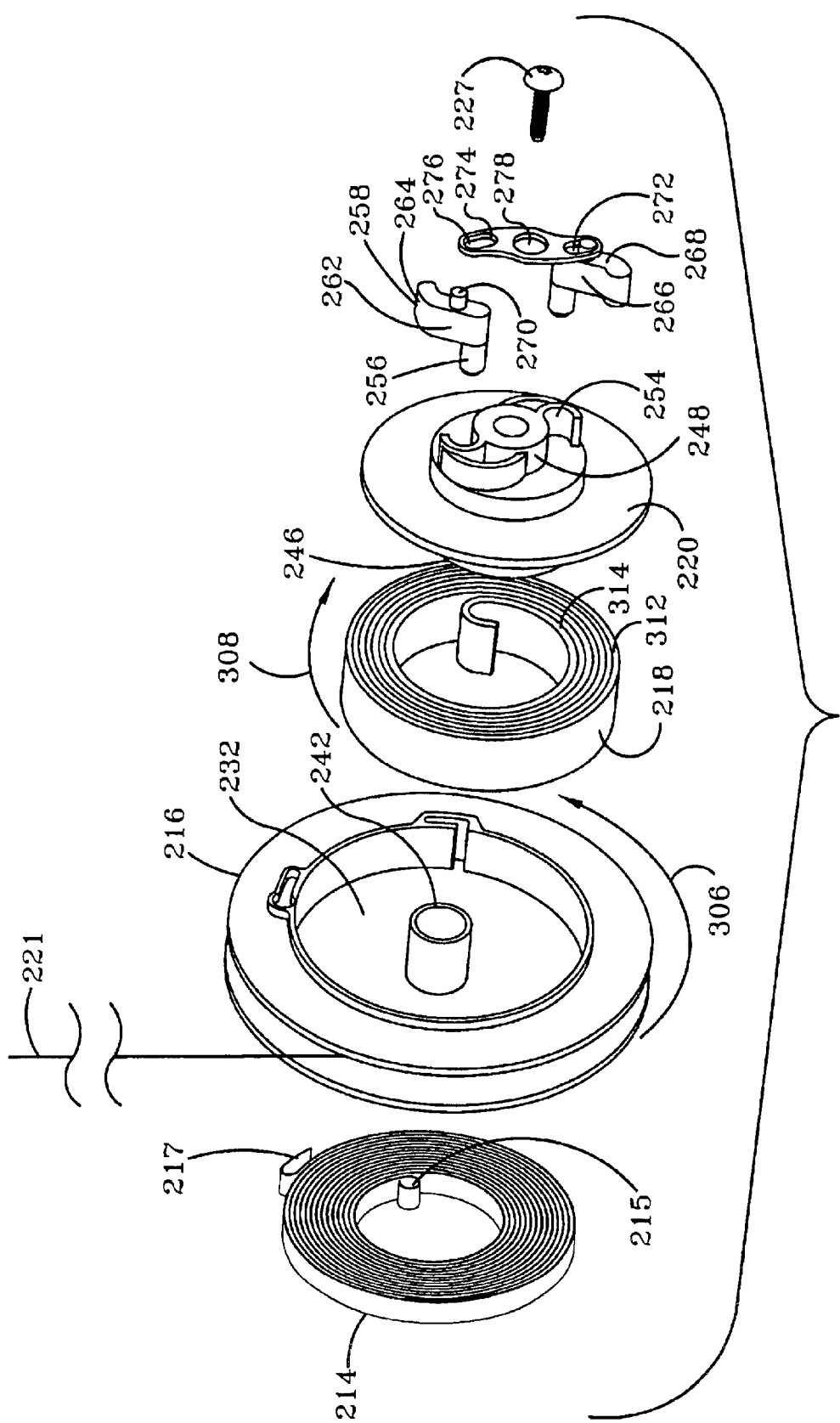
FIG. 16 is an exploded view of the fifth embodiment.
Figure 19:
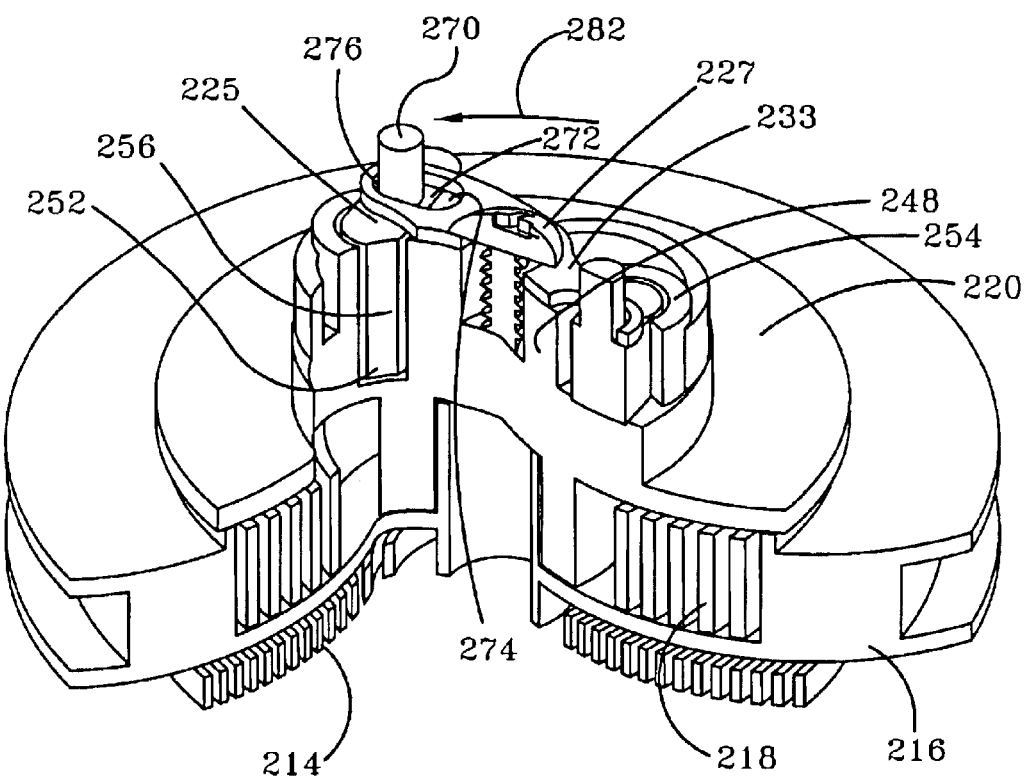
FIG. 19 is a cross-sectional view of the fifth embodiment.

Referring to FIGS. 16–18, the rope return spring 214 has a first U-shaped end 215 that is connected to the housing 212 and a second U-shaped end 217 that connects to the pulley 216. The pulley 216 has a first sleeve 240 that further contains a notch 244. The notch 244 is designed to receive the second U-shaped end 217 of the rope return spring 214. The pulley 216 further consists of a chamber 232 as shown in FIG. 16 that receives the starter spring 218 as illustrated in FIG. 18. A second sleeve 242 extends in an outward direction from the center of the chamber 232. The second sleeve 242 is inserted into the hub 246 when the pulley 216 and arbor 220 are assembled. Furthermore, the pulley 216 has a slot 234 located on the outer portion 231 of the chamber 232 used to attach the starter spring 218 to the pulley 216. Both ends of the starter spring 218 have a U-shaped end 236, 238 designed to attach the starter spring 218 to the pulley 216 and the arbor 220 respectively. The first U-shaped end 236 attaches to the slot 234 on the outer portion 231 of the chamber 232 as illustrated in FIG. 18. The second U-shaped end 238 of the starter spring 218 attaches to the arbor 220 as subsequently described. Referring to FIGS. 16 and 17 the arbor 220 has a first hub 246 and a second hub 248. The first hub 246 further contains a slot 247. The slot 247 receives the second U-shaped end 238 of the starter spring 218 as illustrated in FIG. 17. Located adjacent and on opposite sides of the second hub 248 are two holes 252. The holes 252 receive an end of the starter dogs 225 as will be described below. It should be noted that only one hole 252 is required for the present invention, however, the preferred method of the fifth embodiment uses one hole 252 positioned on either side of the hub 248. An arcuate portion 254 of the second hub 248 partially extends around each hole 252 to provide support for the starter dogs 225. Referring to FIG. 16 the starter dogs 225 consist of a first end 256, a second end 258, and a body 262. The first end 256 is a post type configuration whereby the bottom 260 extends beyond the body 262 of the starter dog 225. The holes 252 receive the bottom 260 of the first end 256 of the starter dog 225 and permit the starter dog 252 to pivot about the axis of the first end 256 as will be described below. During the cranking operation the first end 256 of the starter dog 225 rotates through an arc as indicated by the arrow 282 in FIG. 19 and engages the flywheel 251 as will be further described below. The body 262 further consists of an arcuate portion 264 and a flat portion 266. During the cranking operation the arcuate portion 264 of the body 262 contacts an arcuate engagement portion 290 of the flywheel 251. During non-cranking operations the flat portion 266 of the body 262 resides against a flat portion 280 of the hub 248. Extending from the top 268 of the body 262 is a post 270 that guides the pivoting motion of the starter dog 225 during cranking of the engine 250 as will be described below. A retaining means 233 is positioned over the hub 248 and the starter dogs 225 to secure the starter mechanism 210 to the housing 212 and secure the starter dogs 225 to the arbor 220. The retaining means 233 farther contains apertures 272 positioned at each end of the retaining means 233. The apertures 272 further consist of a first end 274 and a second end 276 and receive the post 270 as shown in FIG. 19. The starter mechanism 210 is attached to the housing 212 by inserting a screw 227 through a center hole 278 in the retaining means 233 and subsequently through the center of the starter mechanism 210 and into the post (not shown) of the housing 212.

With the components of the present invention herein described, the operation of the fifth embodiment of the spring release starter mechanism will now be described. Referring to FIG. 16, the operator grasps the rope handle 223 and begins to pull in a direction away from the engine 250. As the operator pulls the rope handle 223 the starter mechanism 210 begins to rotate in a direction as indicated by the arrow 306. As the mechanism begins to rotate, the retaining means 233 initially remains stationary. The apertures 272 in the retaining means 233 cause the starter dogs 225 to pivot from a first position 286 to a second position 288 due to the post 270 moving along a line defined by the orientation of the apertures 272. In other words, while the retaining means 233 is stationary the post 270 moves from the first end 274 of the aperture 272 to the second end 276 of the aperture 272. Therefore, when the post 270 is at the first end 274 of the aperture 272 the starter dog 225 is in a first position 286 and when the post 270 is at the second end 276 of the aperture 272 the starter dog 225 is in a second position 288. The starter dogs 225 can best be seen in the first position 286 in FIG. 14 and in the second position 288 in FIG. 15. This movement causes the starter dog 225 to pivot about the first end 256 of the starter dog 225 thereby rotating the second end 258 through an arc as shown by the arrow 282 in FIG. 19 therefore allowing the second end 258 of the starter dog 225 to engage a receiving means 284 on the flywheel 251. Once the starter dogs 225 reach the second position 288 the retaining means 233 begins to rotate with the starter mechanism 210. The starter dogs 225 will remain in the second position 288 and continue to engage the receiving means 284 of the flywheel 251 until the operator releases the rope handle 223. Upon engagement of the flywheel 251 by the starter dogs 225 moves the engine's piston to its compression stroke. At this point, the outside coils 312 of the starter spring 238 begin to wind in a direction indicated by the arrow 308 in FIG. 16 while the inside coils 314 of the starter spring 218 remain stationary. As the operator continues to pull the rope handle 223 the starter spring 218 continues to wind and increase in tension. Once the force of the tension in the starter spring 218 exceeds the compression force of the piston (not shown) in the internal combustion engine 250, the inside coils 314 of the starter spring will rotate in the same direction as the outside coils 312. This in turn will cause the arbor 220 to also rotate a sufficient number of times in the direction indicated by the arrow 308 in FIG. 16. Therefore, the starter dogs 225 will be temporarily engaged with the flywheel 251 of the engine 250 and will cause the crankshaft (not shown) to turn thereby starting the engine 250. After the engine 250 is started and the operator releases the rope handle 223, the rope return spring 214 will rotate in such a manner as to cause the pulley 216 to rotate in a direction opposite to the arrow 306 in FIG. 16 thereby returning the rope 221 to the housing 212.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A starter mechanism adapted to be connected to a crankshaft of an internal combustion engine, the engine having a compression stroke that provides an impending compression force stronger than a force initially supplied by the starter mechanism, the starter mechanism configured to accumulate sufficient energy to start the engine, the starter mechanism comprising:
    a starter housing;
    a first spring operatively connected to the starter housing;
    a pulley operatively connected to the first spring, said pulley configured to be rotated within said housing by means of a pull rope;
    a second spring operatively connected to the pulley;
    an arbor operatively connected to the second spring, wherein rotation of the pulley is transmitted to the arbor by the second spring, the pulley being able to rotate more than one complete revolution with respect to the arbor so as to accumulate energy in the second spring; and
    an engagement mechanism operatively connected to the arbor and adapted to be operatively attached to an associated engine crankshaft;
    wherein when the pulley is rotated to start the engine, the compression force of the engine initially impedes rotation of the arbor causing the pulley to rotate more than one complete revolution with respect to the arbor after the crankshaft reaches the compression stroke, said rotation causing the second spring to wind and accumulate sufficient energy therein such that when the second spring overcomes the compression force, the arbor rotates multiple times to start the engine.

2. The starter mechanism of claim 1, wherein the arbor further consists of a first and second hub located on opposite sides of the arbor.

3. The starter mechanism of claim 2 wherein the arbor further comprises at least a first hole located adjacent to the second hub and wherein an arcuate portion of the second hub partially extends around the at least first hole.

4. The starter mechanism of claim 3, wherein the engagement mechanism further comprises a first end, a second end, and a body.

5. The starter mechanism of claim 4, wherein the first end of the engagement mechanism extends beyond the body and is received by the at least first hole and wherein the first end pivots about its axis.

6. The starter mechanism of claim 5, wherein engagement mechanism further comprises a post extending above the body.

7. The starter mechanism of claim 6 further comprising:
    a retaining means operatively attached to the housing.

8. The starter mechanism of claim 7, wherein the retaining means comprises two slotted apertures and a center hole, wherein the two slotted apertures are oriented to guide pivoting motion of the engagement mechanism, and further comprising a screw inserted through the center hole and into a post extending from the housing, the retaining means being attached to the housing by said screw.

9. The starter mechanism of claim 8, wherein the at least first engagement mechanism consists of a starter dog, wherein the starter dog is adapted to be operatively attached to an associated engine flywheel.

10. The starter mechanism of claim 1 wherein the arbor comprises a first hub that is operatively connected to the second spring, and wherein the engagement mechanism comprises a second hub on the arbor comprising at least a first cog adapted to operatively engage an associated engine crankshaft or flywheel of the internal combustion engine.

11. A starter mechanism adapted to be connected to an associated internal combustion engine, comprising:
   a starter housing having a post that extends outwardly;
   an arbor having a first hub, a second hub, and at least one hole adjacent to the first hub, wherein an arcuate portion of the second hub partially extends around the at least first hole;
   a pulley having a first sleeve and a chamber;
   a first spring having first and second ends, the first end of the first sleeve being operatively connected to the starter housing, the second end of the first spring being operatively connected to the first sleeve of the pulley;
   a second spring having first and second ends, the first end of the second spring being operatively connected to an outer portion of the chamber of the pulley, the second end of the second spring being operatively connected to the first hub of the arbor wherein rotation of the pulley is transmitted to the arbor by the second spring, the pulley being able to rotate more than one complete revolution with respect to the arbor so as to accumulate energy in the second spring;
   at least one engagement means having a first end, a second end, a body and, a post extending above the body, the first end being operatively connected to the arbor, and wherein the second end of the engagement means is adapted to drive an associated engine flywheel or crankshaft when the engagement means is pivoted to a flywheel engaging position; and,
   a retaining means operatively attached to the housing, wherein the retaining means further comprises at least one slotted aperture and a center hole, wherein the at least one slotted aperture is oriented to guide pivoting motion of the at least one engagement means, and further comprising a screw inserted through the center hole and into the post extending from the housing, the retaining means being attached to the housing by said screw.

12. The starter mechanism of claim 11, wherein the engagement means further comprises a post extending above the body.

13. The starter mechanism of claim 12, wherein the post engages the aperture.

14. The starter mechanism of claim 11 wherein when the pulley is rotated to start the engine, the compression force of the engine initially impedes rotation of the arbor causing the pulley to rotate more than one complete revolution with respect to the arbor after the crankshaft reaches the compression stroke, said rotation causing the second spring to wind and accumulate sufficient energy therein to start said engine such that when the second spring overcomes the compression force, the arbor rotates multiple times to start the engine.

15. A method of starting an engine, comprising the steps of:
   providing an engine, a starter mechanism having a starter housing, a first spring, a pulley, a second spring, an arbor, an at least first engagement means, a retaining means, and a handle operatively connected to a pull rope, wherein the pulley is operatively connected to rotate the arbor only through the second spring;
   providing the retaining means with an at least first aperture having a first end and a second end;
   providing the at least first engagement means with a post extending above the engagement means and the post being received by the aperture;
   grasping the handle;
   pulling the rope in a direction extending in an outward direction from the housing;
   winding the second spring to facilitate in starting the engine; wherein the step of winding the second spring to facilitate in starting the engine further comprises the steps of:
      rotating the pulley and the arbor to permit the post to move from the first end of the aperture to the second end of the aperture thereby pivoting the engagement means from a first position to a second position to permit the engagement means to engage the flywheel thereby turning the crankshaft and rotating the crankshaft to the compression stroke of the engine whereat the compression force causes the arbor to stop rotating;
      continuing to rotate the pulley relative the arbor to store sufficient energy in the second spring to cause the arbor to rotate multiple times after the energy in the second spring overcomes the compression force and begins to rotate the arbor; and
      releasing the handle to allow the rope to retreat into the housing.

16. The method of claim 15 further comprising the steps of:
   wherein the step of moving the post from the first end of the aperture to the second end of the aperture further comprises:
      pivoting the engagement means from a first position to a second position to permit the engagement means to engage the flywheel thereby turning the crankshaft and starting the engine.

17. A starter mechanism adapted to be connected to the shaft of an internal combustion engine comprising:
   a starter housing;
   a first spring operatively connected to the starter housing;
   a pulley operatively connected to the first spring, said pulley configured to be rotated within said housing by means of a pull rope;
   a second spring operatively connected to the pulley;
   an arbor operatively connected to the second spring, wherein the arbor comprises a first and second hub located on opposite sides of the arbor and at least a first hole located adjacent to the second hub and wherein an arcuate portion of the second hub partially extends around the at least first hole; and
   an at least first engagement mechanism operatively connected to the arbor and adapted to be operatively attached to an associated engine crankshaft, wherein the engagement means is at least partially received by the at least first hole.

18. The starter mechanism of claim 17 further comprising a retaining mechanism, said retaining mechanism having two slotted apertures and a center hole, wherein the two slotted apertures are oriented to guide pivoting motion of the engagement mechanism, and further comprising a screw inserted through the center hole and into a post extending from the housing, the retaining means being attached to the housing by said screw.

19. The starter mechanism of claim 17 wherein rotation of the pulley is transmitted to the arbor by the second spring, the pulley being able to rotate more than one complete revolution with respect to the arbor so as to accumulate energy in the second spring, wherein when the pulley is rotated to start the engine, the compression force of the engine initially impedes rotation of the arbor causing the pulley to rotate more than one complete revolution with respect to the arbor after the crankshaft reaches the compression stroke, said rotation causing the second spring to wind and accumulate sufficient energy therein to start said engine such that when the second spring overcomes the compression force, the arbor rotates multiple times to start the engine.

* * * * *

UNITED STATES PATENT AND TRADEMARK OFFICE
CERTIFICATE OF CORRECTION

PATENT NO. : 6,834,633 B2
DATED : December 28, 2004
INVENTOR(S) : J. Barney Sing et al.

It is certified that error appears in the above-identified patent and that said Letters Patent is hereby corrected as shown below:

Column 8,
Line 11, delete "impending" and substitute -- impeding --.

Signed and Sealed this

Nineteenth Day of April, 2005

JON W. DUDAS
*Director of the United States Patent and Trademark Office*